Nov. 2, 1943.　　　　　L. E. JAMES　　　　　2,333,105
STARTING AND STOPPING MECHANISM
Filed May 31, 1941　　　5 Sheets-Sheet 3

INVENTOR.
Lester E. James, Deceased
By Mary B. James, Administratrix
By her Attorney Nov. 2, 1943. L. E. JAMES 2,333,105
STARTING AND STOPPING MECHANISM
Filed May 31, 1941 5 Sheets-Sheet 4

INVENTOR
Lester E. James, Deceased
By Mary B. James, Administratrix
By her Attorney Nov. 2, 1943.  L. E. JAMES  2,333,105
STARTING AND STOPPING MECHANISM
Filed May 31, 1941  5 Sheets-Sheet 5

INVENTOR
Lester E. James, Deceased
By Mary B. James, Administratrix
By her Attorney Patented Nov. 2, 1943

2,333,105

UNITED STATES PATENT OFFICE 2,333,105

STARTING AND STOPPING MECHANISM

Lester E. James, deceased, late of Swampscott, Mass., by Mary B. James, administratrix, Swampscott, Mass., assignor to United Shoe Machinery Corporation, Flemington, N. J., a corporation of New Jersey Application May 31, 1941, Serial No. 396,046

9 Claims. (Cl. 192—33)

This invention relates to starting and stopping mechanism, and is herein illustrated as embodied in a clutch and associated control mechanism suitable for application to machines of various types.

In the past, considerable difficulty has been experienced in devising satisfactory devices for operatively connecting a driving member to a driven member, particularly where the driving member is moving at high velocity. This is due to the fact that, as the velocity of a moving part increases, its inertia forces increase as a function of the square of the velocity, with the result that when the velocity is high the mechanism for connecting the driving member to the driven member is subject to great strains, which often result in breakage or excessive wear. This is particularly troublesome when it is desired to use a positive clutch, rather than a friction clutch.

It is an object of the present invention to provide an improved starting and stopping mechanism which can be readily operated to connect a driving member to a driven member, without subjecting the parts to excessive strains or shocks, thereby greatly contributing to the smoothness of operation and long life of the machine in which the mechanism is utilized.

To this end and as illustrated, there is provided a starting and stopping mechanism comprising a drive shaft, which is arranged to be rotated continuously at an angular velocity, which is varied so that at one point in each cycle the shaft will be at zero velocity and subjected to zero or nearly zero acceleration, together with a driven member operatively connected to a clutch element having means arranged to engage the shaft, and to be disengaged therefrom at times when the shaft is substantially stationary and subjected to zero or nearly zero acceleration. Preferably, and as shown, this means comprises two dogs carried by the clutch element and arranged to engage opposite sides of a tongue on the shaft. During operation of the mechanism, the shaft engages one of the dogs to rotate the clutch element at low velocity from a stationary position, then increasing its velocity rapidly to a maximum, after which the clutch element is decelerated rapidly until its velocity is small and then is gradually brought to rest at the end of a single revolution thereof.

This mechanism is advantageous in that, since the clutch dogs engage the shaft and are disengaged from the shaft, when it is at zero velocity and zero, or nearly zero acceleration, there is little or no shock in the clutch operation, and, accordingly, the parts are subjected to very little strain, with the result that the life of the mechanism is prolonged.

These and other features of the invention are disclosed in the following specification and the accompanying drawings, and are pointed out in the claims.

Figure 1:
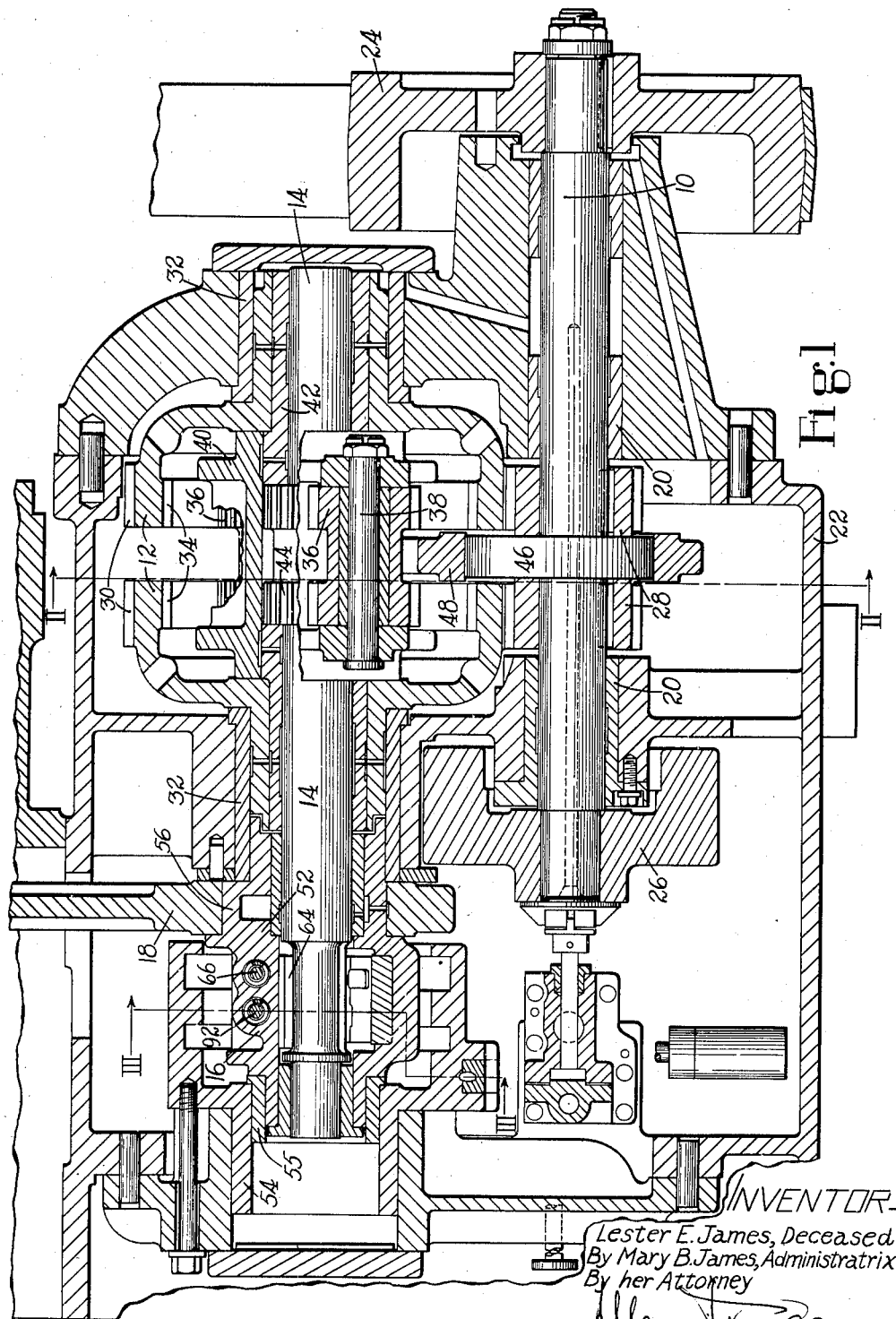
Fig. 1 is a vertical cross sectional view of a machine embodying one form of starting and stopping mechanism construction in accordance with the invention.

The illustrated mechanism comprises a drive shaft 10 (Fig. 1) arranged to be rotated at a constant speed and operative through a planetary gear system, including ring gears 12, to drive a shaft 14 at an angular velocity varying from zero to a predetermined maximum and back to zero during each revolution of the shaft 14, and a clutch 16 arranged for operatively connecting the shaft 14 to a driven member 18 when the shaft 14 is moving at zero velocity and thereafter to effect oscillation of the driven member, after which the clutch is disconnected from the shaft 14 when the latter again approaches its zero velocity.

Figure 2:
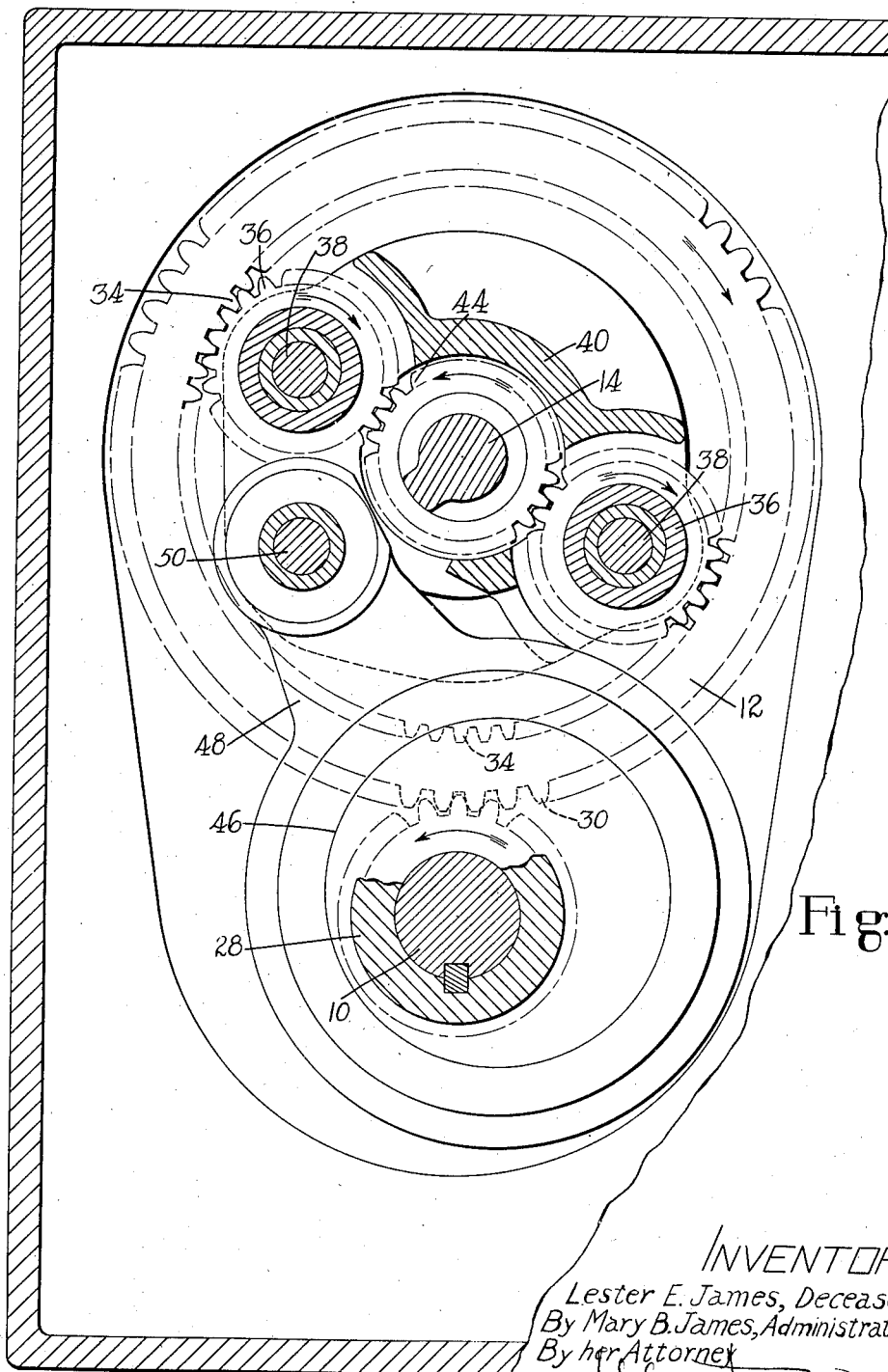
Fig. 2 is a vertical cross sectional view, taken along lines II—II of Fig. 1, showing a portion of the mechanism for varying the speed of the driving member.

The drive shaft 10 is mounted in bearings 20 in a casing 22, the shaft being rotated at a constant speed by a flywheel 24 on one end of the shaft, there being an equalizing weight 26 on the opposite end of the shaft. The shaft 10 is provided with two gears 28 (Figs. 1 and 2) which mesh with external teeth 30 on the ring gears 12, likewise to rotate the ring gears at constant speed in their bearings 32. Each of the ring gears is provided with internal teeth 34, which make engagement with two planetary pinions 36 which are mounted upon pins 38 carried by a cage 40 rotatably mounted upon a sleeve 42. The pinions 36 mesh with the teeth of a sun gear 44 secured to the shaft 14, which is mounted for rotation in the sleeve 42. The pinions 36 and the sun gear 44 are of the same pitch diameter and have the same number of teeth, and consequently if the cage 40 were maintained stationary, the shaft 14 would revolve at a constant velocity in the same direction as the drive shaft 10. However, mechanism is provided for varying the angular position of the cage 40 to effect variation in the relative speeds of the two shafts. To this end, the shaft 10 is provided with an eccentric 46 upon which is positioned a connecting rod 48, the end of which is connected to a pin 50 (Fig. 2) carried by the cage 40. As the shaft 10 rotates, the connecting rod 50 is oscillated, thus causing limited angular movement of the cage about the axis of the shaft 14. When the cage is moved angularly in the same direction as the movement of the internal gear 34, the effect is to rotate the cage in a clockwise direction (Fig. 2), with the result that the pinions 36 tend to revolve about the sun gear 44 without driving it, or driving it at a reduced speed. When the cage is moved in a counterclockwise direction the reverse of this takes place, and the sun gear 44 and consequently the shaft 14 are rotated at an increased speed. It has been found that if the radius of the eccentric 46 is made equal to one-half of the radius of the sun gear 44, the cage will be rotated with a speed relative to that of the internal gear 34, such that the shaft 14 will momentarily be held stationary at zero, or nearly zero, acceleration, during each revolution of the drive shaft 10. Thus, upon rotation of the drive shaft 10 at a constant speed, the shaft 14, during each revolution, will be rotated at velocities varying from zero to a maximum velocity, depending upon the velocity of the drive shaft 10, and back again to zero velocity.

Mechanism is provided for operatively connecting the driven member 18 to the shaft 14 during such time as the shaft 14 is rotating at zero velocity and substantially zero acceleration. To this end, the clutch 16 comprises a clutch element 52 (Fig. 1), which is rotatable in a casing 54 in a bearing 55 and one of the bearings 32, and has an eccentric 56 arranged to carry the driven member 18.

The clutch element has two shaft engaging members comprising a drive dog 58 (Fig. 3), and a deceleration dog 60 mounted upon a pivot 62 on the clutch body and arranged to embrace a tongue 64 on the shaft 14, thus to secure the clutch element to the shaft for rotation therewith, the two dogs being arranged for movement into and out of shaft engaging position by a mechanism operable in timed relation to angular movements of the shaft.

The drive dog 58 is continually urged in a counterclockwise direction (Fig. 4) by a plunger 66, under the action of a spring 68, and has a portion 70 which can be moved into the path of the tongue 64 in effecting engagement of the clutch element with the shaft 14. The dog has a tail portion 72 arranged, when the clutch is to be released, to engage a stop lever 74 which moves the dog, against the force of the spring 68, in a clockwise direction to retract the tongue engaging portion 70 and to bring the parts to rest with an extension 76 on the dog in engagement with a buffer member 78 on the body of the clutch.

The drive dog 58 carries a timing latch 80 mounted on a pivot 82 and having a tail portion 84 normally urged by a spring 86 into engagement with an abutment 88 on the clutch element 52 and a nose portion 90 movable into the path of the tongue 64 in controlling operation of the drive dog 58, as will hereinafter be described.

Figure 8:
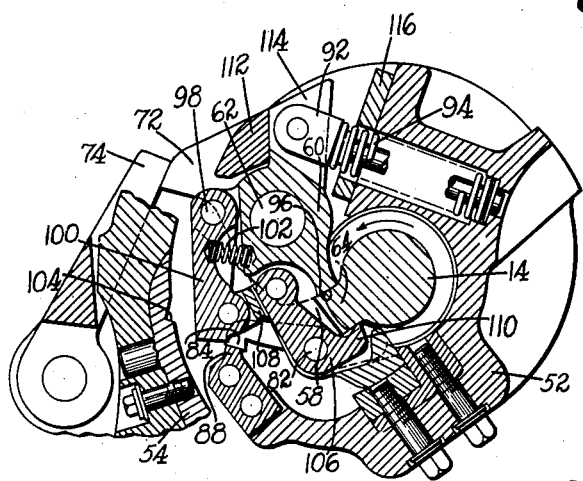

The deceleration dog 60 is likewise continually urged (Figs. 3, 5, 7 and 8) in a counterclockwise direction by a plunger 92 under the action of a spring 94 and has a portion 96 which can be moved into engagement with the rearward side of the tongue 64, as shown in Fig. 8, in cooperating with the drive dog 58 to cause engagement of the clutch with the shaft. The dog 60 carries a pivot 98 upon which is mounted a lock pawl 100 normally urged outwardly by a spring 102 toward the casing 54, which has a recessed ledge 104 adapted to engage the pawl 100 at a predetermined time to hold the dog 60 stationary with the engaging portion 96 withdrawn from the path of movement of the tongue 64. The lock pawl 100 is arranged to be withdrawn from the ledge 104 at the proper time by a timing lever 106 mounted upon the pivot 82 and pivotally connected to the lock pawl 100 by a link 108. The lever 106 has a nose portion 110 which is moved inwardly with the shaft engaging portion 70 of the drive dog 58, when the latter is moved into the path of the tongue 64. The drive dog 58 has an abutment 112 arranged to engage an extension 114 on the deceleration dog 60 to effect movement of the latter in a clockwise direction in withdrawing the surface 96 from engagement with the tongue 64, there being a buffer member 116 on the clutch element for limiting clockwise movement of the dog 60.

When the clutch element 52 is operatively engaged with the shaft 14, the driving force of the shaft is transmitted through the tongue 64 and the drive dog 58. When in engaged position, the dog 58 is positioned over a wear plate 118 secured to the wall of the clutch element by a bolt 120, and the forward portion of the drive dog bears against an abutment 122 secured to the clutch element by a bolt 124.

Figure 3:
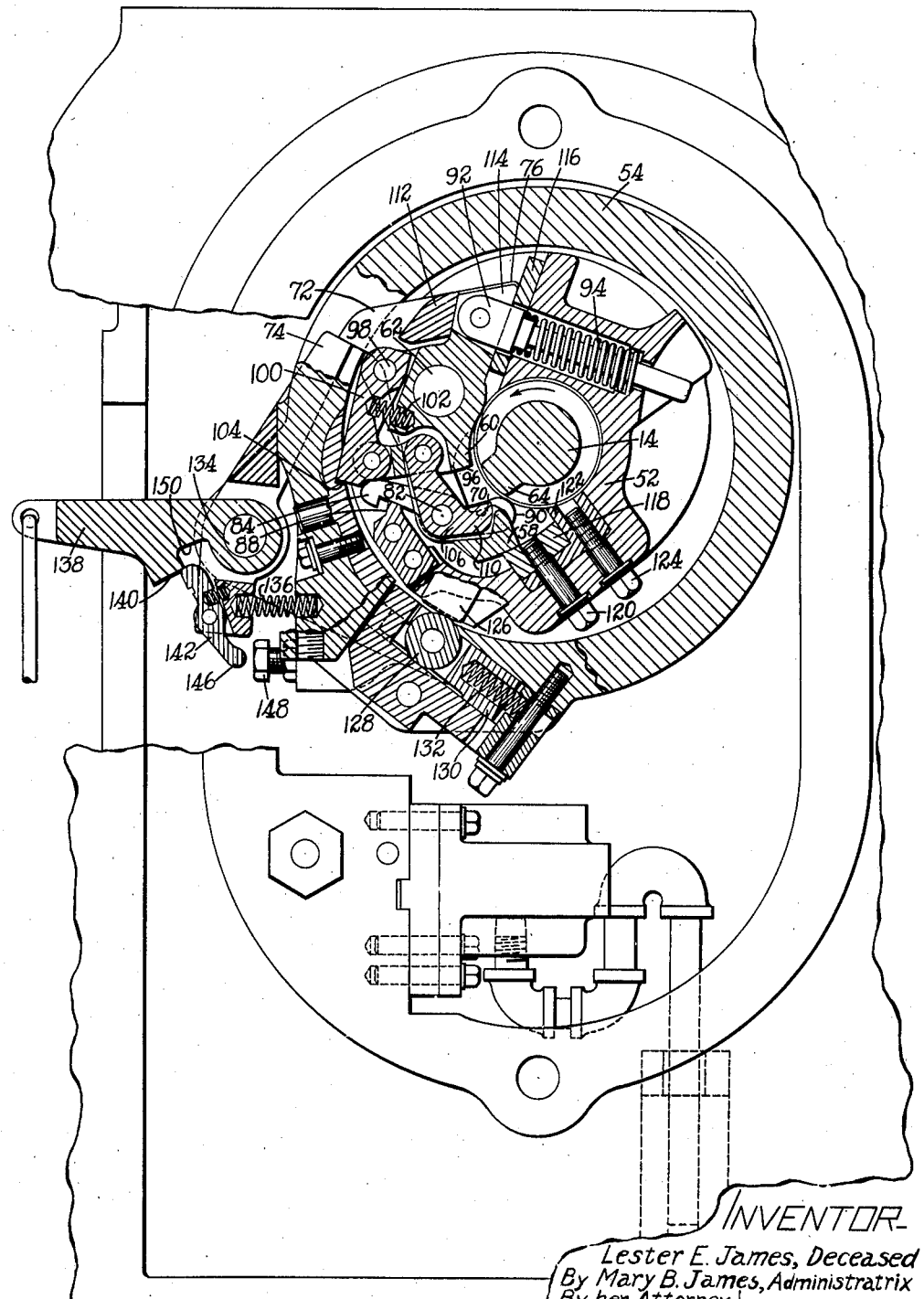
Fig. 3 is a vertical cross sectional view, taken along the lines III—III of Fig. 1, showing a portion of the clutch and its control mechanism.

When the clutch element is at rest in the position shown in Fig. 3, there is a tendency for the springs 68 and 94, acting upon the dogs 58 and 60, to rotate the clutch element in a clockwise direction. To prevent this, there is provided a lug 126 on the clutch element, arranged, when the clutch element is stationary, to engage a roll 128 carried in a slide 130 forced inwardly by a spring 132. This roll projects into the path of the lug and prevents rearward movement thereof, thus locking the clutch element against reverse movement. When the clutch element is operatively connected to the shaft 14 and starts to rotate, the lug 126 moves the roll out of its path, permitting the clutch element to rotate in a counterclockwise direction.

The stop lever 74 is loosely mounted upon a shaft 134 and is normally urged by a spring 136 into position to engage the tail 72 of the drive dog 58.

In order to operate the stop lever 74 to initiate clutch engagement, there is provided a manually operable lever 138 mounted upon the shaft 134 and having a lug 140 arranged to engage the upper end of a latch 142 pivoted upon the tail portion of the lever 74. There is a spring 144 arranged to force the end of the latch 142 in a direction to position it beneath the lug 140. The latch 142 has a tail portion 146 arranged to engage a stop 148 when the lever 138 has been rotated through a small angular distance somewhat greater than necessary to release the stop lever 74. When this occurs, the upper end of the latch 142 will be rotated in a clockwise direction, and the latch will be received in a recess 150 in the lever 138, thus releasing the stop lever 74 from operation by the lever 138, and the lever 74 is rotated inwardly into the path of the nose 72 by the spring 136. This construction is such that the stop lever 74 is returned into position to disconnect the clutch from the shaft after a single revolution, even though the manually operated lever 138 is held in depressed position. Thus repetition of the cycle is prevented.

Figure 4:
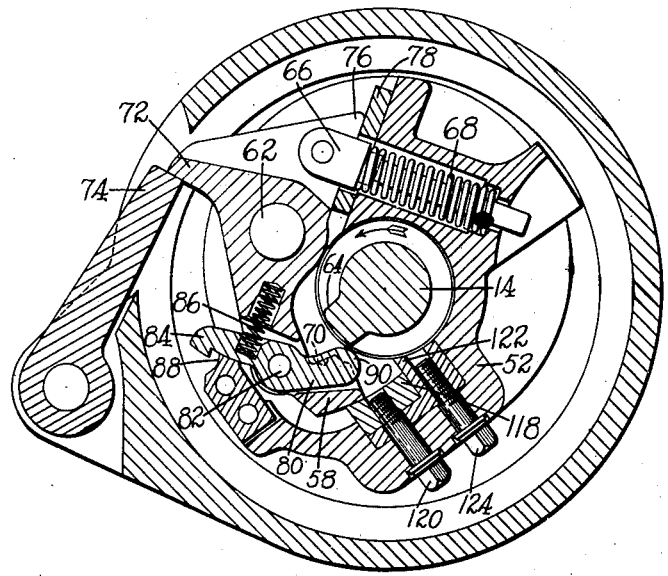
Figs. 4, 5, 6, 7 and 8 are cross sectional views through portions of the clutch, illustrating the positions of the parts during different portions of the cycle of operation.
Figure 5:
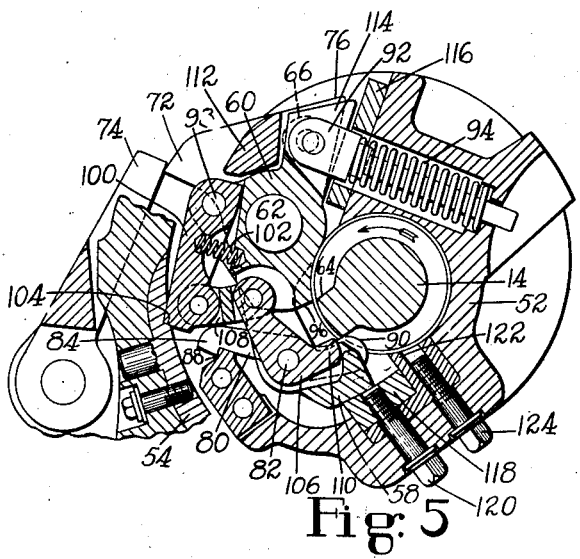

Figs. 3 and 4 show the clutch element 52 in stationary position with the various shaft engaging parts withdrawn from the path of the tongue 64, so that the shaft 14 is free to revolve without influencing the clutch parts. As shown, the clutch element is locked against rotation in a clockwise direction by the roll 128 and in a counterclockwise direction by the stop lever 74 which (as best shown in Fig. 4) engages the tail 72 of the drive dog 58 holding the tongue engaging surface 70 and the timing latch 90 in retracted position with the spring 68 compressed, and (as best shown in Fig. 3) the abutment 112 engages the extension 114 of the deceleration dog 60 holding the tongue engaging surface 96 and the timing lever 106 in retracted position with the spring 94 compressed.

Clutch operation is initiated by rotating the stop lever 74 out of engagement with the drive dog 58. When this occurs the clutch parts assume the positions shown in Fig. 5, in which it is to be noted that the spring pressed plunger 66 has rotated the drive dog 58 in a counterclockwise direction until the nose portion 90 of the timing latch 80 has been moved into the path of the tongue 64, continued movement of the dog being prevented by engagement of the tail portion 84 of the latch with the abutment 88. At the same time, the spring pressed plunger 92 has moved the deceleration dog 60 in a counterclockwise direction until the lock pawl 100 has engaged the ledge 104, thus temporarily locking the dog 60 and its associated parts against further movement.

Figure 6:
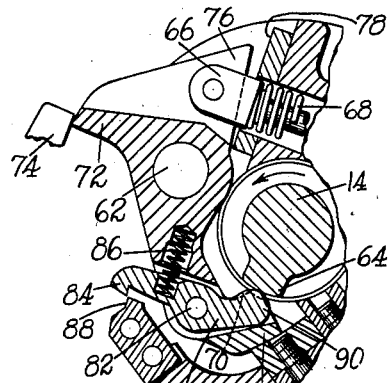
Figure 7:
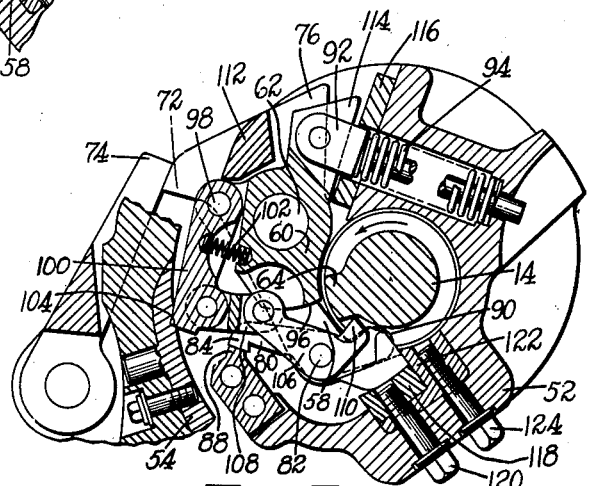

Upon the next revolution of the shaft 14, the tongue 64 (Fig. 6) engages the nose portion 90 of the timing latch 80, rotating the latter about its pivot 82 and releasing it from the abutment 88, which permits the spring 68 to rotate the drive dog 58 until its forward portion (Fig. 7) engages the abutment 122 on the clutch element. During this movement the pivot 82 is moved away from the stationary lock pawl 100, and the timing lever 106 is caused to move in a counterclockwise direction, positioning its nose portion 110 in the path of the tongue 64.

Upon further revolution of the shaft 14, the tongue 64 engages the nose portion 110 rotating the timing lever 106 in a clockwise direction, which results in pulling the lock pawl 100 off the ledge 104, as shown in Fig. 8, and the spring 94 rotates the deceleration dog 60 in a counterclockwise direction until the extension 114 engages the abutment 112. During this movement, the tongue engaging portion 96 of the deceleration dog is moved into position behind the tongue 64 just as the tongue engages the drive dog 58.

Fig. 8 shows the parts in position with the drive dog 58 and the deceleration dog 60 engaging opposite sides of the tongue 64, thus locking the clutch body to the shaft 14 for rotation therewith. The angular position of the shaft 14, shown in Fig. 8, is that in which its velocity is zero, and its acceleration is zero or nearly zero. Consequently, the clutching operation is accomplished with little or no shock or strain on the parts.

Rotation of the clutch element 52 through one revolution causes corresponding rotation of the eccentric 56, which effects a reciprocation of the driven member 18. The variable velocity and acceleration imparted to the shaft 14, by means of the planetary gears 36, is such that the driven parts start from a position of rest and are gradually accelerated through a portion of the cycle, then more rapidly until the maximum velocity is reached, after which they are rapidly decelerated until the velocity and acceleration are brought to low values, and then the parts are slowly brought to rest and the clutch dogs are withdrawn to disconnect the clutch element 52 from the shaft.

After the shaft 14 reaches its maximum velocity and begins to slow down, it acts as a brake, the braking pressure being applied by the tongue 64 to the engaging surface 96 of the deceleration dog 60. Thus, as the shaft decelerates near the end of its cycle, the clutch element is correspondingly decelerated, this action being cushioned by the springs 68 and 94.

At about 359° of rotation, the tail portion 72 of the drive dog 58 engages the stop lever 74 which has been rotated into its path. As a result of this, the dogs 58 and 60 are rotated in a clockwise direction, withdrawing from the shaft 14 the engaging portions 70 and 96, as well as the timing latch 80 and the timing lever 106 from the path of the tongue 64, and the clutch element comes to rest with the parts in the positions shown in Fig. 3.

Since the dogs are disconnected from the shaft when the latter is close to zero velocity and zero acceleration, the clutch element has only a small momentum which is absorbed by the springs 68 and 94 and the buffers 78 and 116, with the result that the parts come to rest without appreciable shock.

Having described the invention, what is claimed as new and desired to be secured by Letters Patent of the United States is:

1. Starting and stopping mechanism comprising a drive shaft, means for continuously rotating the shaft at a varying speed such that the velocity of the shaft is zero at the beginning and at the end of each revolution, a clutch member mounted for rotation about the shaft, a tongue on the shaft, dogs carried by the clutch member and arranged to engage opposite sides of the tongue thereby to connect the clutch member to the shaft for rotation therewith, means for causing the dogs to engage the tongue at a time when the shaft is rotating at substantially zero velocity, and means for withdrawing the dogs from the shaft after a single revolution thereof when the shaft is again rotating at substantially zero velocity.

2. Starting and stopping mechanism comprising a rotary drive shaft, a tongue on the shaft, a clutch element surrounding the shaft and mounted for rotation about the axis thereof, a drive dog pivotally mounted upon the clutch element arranged for movement into the path of the tongue, a second dog pivotally mounted upon the clutch element for movement into position to engage the tongue upon the opposite side of the drive dog, springs for urging the dogs in a direction toward the shaft, a stop lever normally operative to engage one of the dogs to hold the dogs out of operative position relatively to the shaft, a timing latch carried by the drive dog arranged for movement into the path of the tongue when the stop lever is released, a latch carried by the second-mentioned dog for preventing movement of the dogs into the path of the tongue after release of the stop lever, and a connection between the timing latch and the second-mentioned latch for releasing the latter upon engagement of the tongue with the timing latch thereby to permit the dogs to engage the shaft.

3. Starting and stopping mechanism comprising a rotary drive shaft, a tongue on the shaft, a clutch element surrounding the shaft and mounted for rotation about the axis thereof, a drive dog and a deceleration dog, each pivoted upon the clutch element for movement toward the shaft into engagement with the tongue, springs normally to force the dogs toward the shaft, a stop lever for arresting movement of the dogs toward the shaft until a predetermined point in the cycle of rotation of the shaft, a timing member movable initially into the path of movement of the tongue upon release of the stop lever, and means operable upon engagement of the tongue with the timing lever for initiating a movement of the dogs into shaft engaging position.

4. Starting and stopping mechanism comprising a rotary drive shaft, a tongue on the shaft, a clutch element surrounding the shaft and mounted for rotation about the axis thereof, a drive dog and a deceleration dog, each pivoted upon the clutch element for movement toward the shaft into engagement with the tongue, springs normally to force the dogs toward the shaft, a stop lever for arresting movement of the dogs toward the shaft until a predetermined point in the cycle of rotation of the shaft, a timing member movable initially into the path of movement of the tongue upon release of the stop lever, means operable upon engagement of the tongue with the timing lever for initiating a movement of the dogs into shaft engaging position, means operable near the end of a single revolution of the clutch element for locating the stop lever in position to engage one of the dogs, and means operable at the end of a single revolution of the clutch element to withdraw the dogs from engagement with the tongue.

5. Starting and stopping mechanism comprising a drive shaft, a tongue on the drive shaft, a clutch element mounted for rotation about the axis of the shaft, dogs movable into engagement with the tongue for securing the clutch element to the shaft for rotation therewith, a stop lever normally operative to prevent rotation of the clutch element in the direction of the drive shaft, a timing latch carried by the drive dog and movable upon release of the stop lever into the path of movement of the tongue, a latch for preventing movement of the dogs into the path of movement of the tongue upon release of the stop lever, and means connecting the timing member and the latch for releasing the latter upon engagement of the tongue with the timing member.

6. Starting and stopping mechanism comprising a drive shaft, means for continuously rotating the shaft at varying velocity such that during each revolution of the shaft the velocity thereof is substantially zero at the beginning and end of the revolution, a clutch element mounted for rotation about the axis of the shaft, a drive dog and a deceleration dog each mounted upon the clutch element for movement into engagement with the shaft, resilient means operable to urge the dogs toward the shaft, a stop lever normally operable to maintain the dogs in retracted position, a timing member movable into the path of the shaft upon release of the stop lever, a latch for temporarily retaining the dogs in retracted position after the stop lever has been released, and connections between the timing lever and the latch for releasing the latter when the shaft has rotated into position in which its velocity is substantially zero.

7. Starting and stopping mechanism comprising a rotary drive shaft, a tongue on the shaft, a clutch element mounted for rotation about the shaft, a drive dog pivotally mounted upon the clutch element having a portion movable into the path of the tongue, a spring for urging the drive dog toward the shaft, a deceleration dog pivotally mounted upon the clutch element and having a portion movable into engagement with the tongue upon the side opposite to that engaged by the drive dog, a spring for urging the deceleration dog toward the shaft, a stop lever normally operative to hold the clutch element stationary relatively to the shaft, a timing latch pivotally mounted upon the drive dog and having a portion movable into the path of the tongue upon release of the stop lever and a portion for engaging the frame of the machine to prevent further movement of the drive dog toward the shaft, a pawl carried by the deceleration dog for engaging a portion of the frame of the machine for preventing movement of the deceleration dog toward the shaft, a timing lever carried by the drive dog and movable into the path of the tongue upon engagement of the tongue with the timing latch, a connection between the timing lever and the pawl for releasing the same upon subsequent engagement of the tongue with the timing lever thereby to permit rotation of the driving dog and the deceleration dog into engagement with the shaft to secure the clutch element to the shaft for rotation therewith, and means for locating the stop lever in position to arrest the clutch element at the end of a single revolution thereof.

8. Starting and stopping mechanism comprising a shaft, means for rotating the shaft at varying velocity such that at the beginning and end of each cycle of operation the shaft is moving at nearly zero velocity and under nearly zero acceleration, a clutch element, a drive dog and a deceleration dog carried by the clutch element, each dog being movable into and out of engagement with the shaft, a stop lever normally operative to hold the clutch body against rotation with the dogs out of engagement with the shaft, a timing latch movable into the path of movement of the shaft upon release of the stop lever and operable upon engagement with the shaft to move the drive dog into the path of movement of the shaft when the latter is moving at low velocity, and a timing lever connected to the deceleration dog and movable with the drive dog into the path of movement of the shaft and operable upon engagement with the shaft to move the deceleration dog into engagement with the shaft, thereby operatively to connect the clutch element to the shaft for rotation therewith.

9. Starting and stopping mechanism comprising a shaft, means for rotating the shaft at varying velocity such that at the beginning and end of each cycle of operation the shaft is moving at near zero velocity and under nearly zero acceleration, a clutch element, a drive dog carried by the clutch element and movable into and out of engagement with the shaft, a stop lever normally operative to hold the clutch element against rotation with the drive dog out of engagement with the shaft, a timing latch movable into the path of movement of the shaft upon release of the stop lever and operable upon engagement with the shaft to move the drive dog into the path of movement of the shaft when the latter is moving at low velocity, and means operable near the end of a single revolution of the shaft to withdraw the drive dog from engagement therewith.

MARY B. JAMES,
*Administratrix of the Estate of Lester E. James, Deceased.*